US009067679B2

(12) United States Patent
Scimone

(10) Patent No.: US 9,067,679 B2
(45) Date of Patent: Jun. 30, 2015

(54) HEATED SCREEN FOR AIR INTAKE OF AIRCRAFT ENGINES

(71) Applicant: Aerospace Filtration Systems, Inc., Chesterfield, MO (US)

(72) Inventor: Michael J. Scimone, St. Louis, MO (US)

(*) Notice: Subject to any disclaimer, the term of this patent is extended or adjusted under 35 U.S.C. 154(b) by 220 days.

(21) Appl. No.: 13/730,233

(22) Filed: Dec. 28, 2012

(65) Prior Publication Data

US 2014/0077039 A1    Mar. 20, 2014

Related U.S. Application Data

(60) Provisional application No. 61/581,784, filed on Dec. 30, 2011.

(51) Int. Cl.
| *B64D 33/02* | (2006.01) |
| *B64D 15/00* | (2006.01) |
| *F02C 7/055* | (2006.01) |
| *F02C 7/047* | (2006.01) |
| *B64C 27/28* | (2006.01) |
| *B64D 15/12* | (2006.01) |

(52) U.S. Cl.
CPC ............ *B64D 15/00* (2013.01); *F02C 7/055* (2013.01); *F02C 7/047* (2013.01); *B64C 27/28* (2013.01); *B64D 15/12* (2013.01); *B64D 2033/022* (2013.01); *B64D 2033/0233* (2013.01); *B64D 2033/0246* (2013.01); *Y02T 50/672* (2013.01)

(58) Field of Classification Search
USPC ........ 244/53 B, 134 B, 134 R, 134 D, 134 C; 55/306; 60/39.093, 39.092
See application file for complete search history.

(56) References Cited

U.S. PATENT DOCUMENTS

| 2,375,369 | A | * | 5/1945 | Knight et al. | 237/12.3 R |
|---|---|---|---|---|---|
| 2,496,279 | A | * | 2/1950 | Ely et al. | 219/528 |
| 2,507,018 | A | | 5/1950 | Jewett et al. | |
| 2,553,512 | A | | 5/1951 | Cotton, Jr. | |
| 2,655,308 | A | * | 10/1953 | Luttman | 415/177 |
| 2,663,993 | A | * | 12/1953 | Mosser | 60/223 |
| 2,680,345 | A | | 6/1954 | Frost | |
| 2,787,694 | A | * | 4/1957 | Farries | 219/202 |
| 2,967,415 | A | * | 1/1961 | Ford et al. | 66/193 |
| 3,121,545 | A | * | 2/1964 | Meletion | 244/53 B |
| 3,421,296 | A | * | 1/1969 | Beurer, Sr. | 55/306 |
| 3,449,891 | A | * | 6/1969 | Amelio et al. | 55/306 |
| 3,811,254 | A | * | 5/1974 | Amelio | 55/306 |
| 4,250,703 | A | * | 2/1981 | Norris et al. | 60/39.092 |
| 4,760,978 | A | * | 8/1988 | Schuyler et al. | 244/134 D |
| 4,942,078 | A | | 7/1990 | Newman et al. | |
| 4,972,197 | A | | 11/1990 | McCauley et al. | |
| 5,083,423 | A | * | 1/1992 | Prochaska et al. | 60/772 |

(Continued)

*Primary Examiner* — Christopher P Ellis
*Assistant Examiner* — Medhat Badawi
(74) *Attorney, Agent, or Firm* — Armstrong Teasdale LLP

(57) ABSTRACT

An aircraft includes a fuselage and wings mounted on opposite sides of the fuselage for sustained forward flight. An engine is mounted in the fuselage or at least one of the wings and includes an air intake. At least a portion of the air intake generally faces the forward direction for receiving intake air during forward flight. A filter assembly is mounted adjacent the air intake and disposed to impinge air and block objects from passing therethrough. A heated screen includes a heater and is mounted adjacent the air intake and upstream of the engine such that ice entering the air intake contacts the heated screen before entering the engine. A power source is provided to supply power to the heater.

20 Claims, 7 Drawing Sheets

(56) References Cited

U.S. PATENT DOCUMENTS

| | | | |
|---|---|---|---|
| 5,422,462 A * | 6/1995 | Kishimoto | 219/545 |
| 5,697,394 A * | 12/1997 | Smith et al. | 137/15.1 |
| 6,027,304 A * | 2/2000 | Arar et al. | 415/116 |
| 6,138,950 A | 10/2000 | Wainfan et al. | |
| 6,824,582 B2 * | 11/2004 | Wilson | 55/385.3 |
| 7,147,182 B1 * | 12/2006 | Flanigan | 244/6 |
| 7,192,462 B2 * | 3/2007 | Stelzer et al. | 55/306 |
| 7,246,480 B2 | 7/2007 | Ritland | |
| 7,291,815 B2 | 11/2007 | Hubert et al. | |
| 7,491,253 B2 * | 2/2009 | Wilson | 55/306 |
| 7,575,014 B2 * | 8/2009 | Stelzer | 137/15.1 |
| 7,586,419 B2 | 9/2009 | Ikiades et al. | |
| 7,625,415 B2 * | 12/2009 | Durocher et al. | 55/306 |
| 7,634,984 B2 * | 12/2009 | Stelzer et al. | 123/198 E |
| 7,837,150 B2 | 11/2010 | Zecca et al. | |
| 8,261,528 B2 * | 9/2012 | Chillar et al. | 60/39.093 |
| 8,413,930 B2 | 4/2013 | Gregory et al. | |
| 8,439,297 B2 * | 5/2013 | Colaprisco et al. | 244/53 B |
| 2006/0201933 A1 * | 9/2006 | Carpino et al. | 219/545 |
| 2007/0151214 A1 | 7/2007 | Stelzer et al. | |
| 2007/0164015 A1 * | 7/2007 | Carpino et al. | 219/528 |
| 2009/0242703 A1 | 10/2009 | Alexander et al. | |
| 2010/0054919 A1 * | 3/2010 | Hiner et al. | 415/121.2 |
| 2010/0107576 A1 * | 5/2010 | Belyew | 55/306 |
| 2010/0155538 A1 | 6/2010 | Calder et al. | |
| 2010/0270427 A1 * | 10/2010 | Barrientos et al. | 244/1 R |
| 2011/0049300 A1 * | 3/2011 | Safai et al. | 244/134 D |
| 2011/0108676 A1 * | 5/2011 | Colaprisco et al. | 244/53 B |
| 2011/0179765 A1 * | 7/2011 | Lalli | 60/39.093 |
| 2011/0265650 A1 | 11/2011 | Kazlauskas et al. | 95/269 |
| 2011/0290784 A1 * | 12/2011 | Orawetz et al. | 219/486 |
| 2012/0298653 A1 | 11/2012 | Lewis et al. | |

* cited by examiner

HEATED SCREEN FOR AIR INTAKE OF AIRCRAFT ENGINES

CROSS REFERENCE TO RELATED APPLICATIONS

This application claims priority to U.S. Provisional Application No. 61/581,784, filed Dec. 30, 2011, the disclosure of which is hereby incorporated by reference in its entirety.

FIELD

The field of this disclosure relates generally to air intake systems for aircraft and related methods, and more particularly, to heated screens and anti-icing systems for aircraft engine air intakes.

BACKGROUND

This section is intended to introduce various aspects of art that may be related to various aspects of the present disclosure, which are described and/or claimed below. This discussion should be helpful in providing background information to facilitate a better understanding of the various aspects of the present invention. These statements are to be read in this light, and not as admissions of prior art.

An engine for aircraft propulsion requires intake air that is free from contaminants to provide for efficient combustion and avoid damage to internal engine components. Some known compressors and turbines are designed with small clearances between moving parts that maximize efficiency, but which also increase vulnerability to damage of engine parts from small foreign particles. Contamination of intake air, even in a small amount, may cause premature wear on engine components, increases maintenance costs, and degrades operational performance and reliability. Aircraft are exposed to contaminants when operating at low altitudes where air is frequently contaminated with material from the ground, such as sand and dust. This problem may be worse for helicopters and for tiltrotor aircraft due to rotor downwash and prolonged low-altitude operation. This problem may also be worse for fixed wing aircraft operating from unimproved airfields. Aircraft, including tiltrotor aircraft, also have a higher operating altitude than conventional helicopters and are thereby more frequently exposed to icing conditions in flight. Such conditions can cause ice to form in and around the engine intake, and this ice may damage the engine if allowed to enter the engine. A better system for preventing ice and contaminants from entering the engine is needed.

SUMMARY

In one aspect, an aircraft includes a fuselage and wings mounted on opposite sides of the fuselage for sustained forward flight. An engine is mounted in the fuselage or at least one of the wings and includes an air intake. At least a portion of the air intake generally faces the forward direction for receiving intake air during forward flight. A filter assembly is mounted adjacent the air intake and disposed to impinge air and block objects from passing therethrough. A heated screen includes a heater embedded therein and is mounted adjacent the air intake and upstream of the engine such that ice entering the air intake contacts the heated screen before entering the engine. A power source is provided to supply power to the heater.

In another aspect, a filter and anti-icing system for an air intake of an aircraft engine includes a filter assembly disposed to impinge air and block objects from passing therethrough. A heated screen is mounted adjacent the filter such that ice contacts the screen before entering the engine. The heated screen includes a heat conducting plate embedded therein. A power source is provided to supply power to the heater.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The drawings are not to scale and certain features may be exaggerated for ease of illustration.

DETAILED DESCRIPTION

Figure 1:
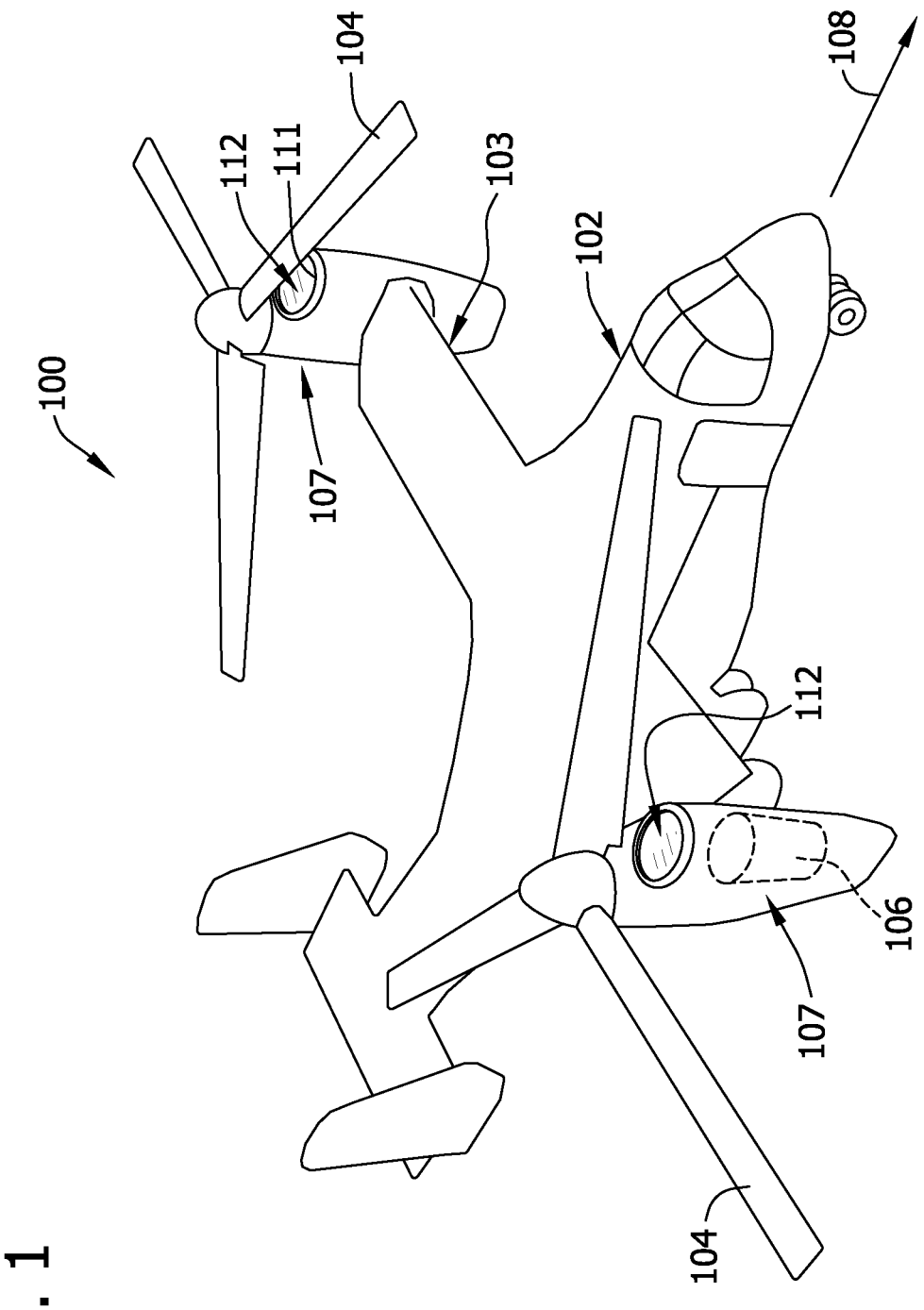
FIG. 1 is a perspective view of an aircraft (V-22) according to one embodiment of the present disclosure.
Figure 5:
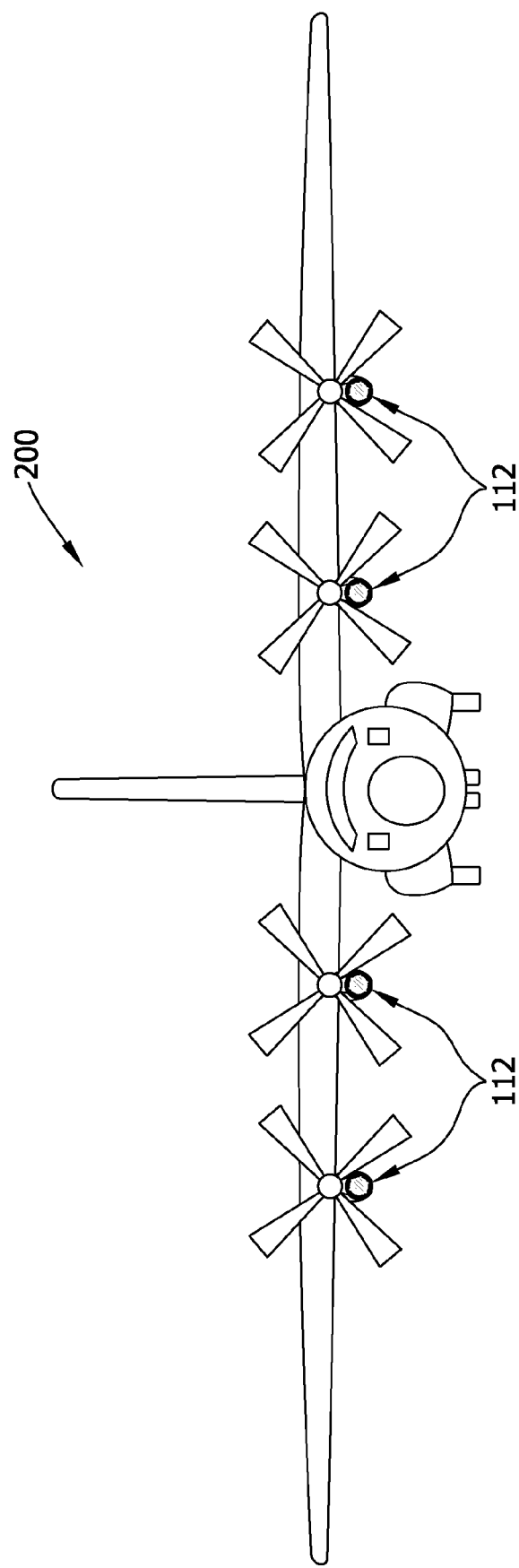
FIG. 5 is a front view of another aircraft (C-130) according to another embodiment.
Figure 6:
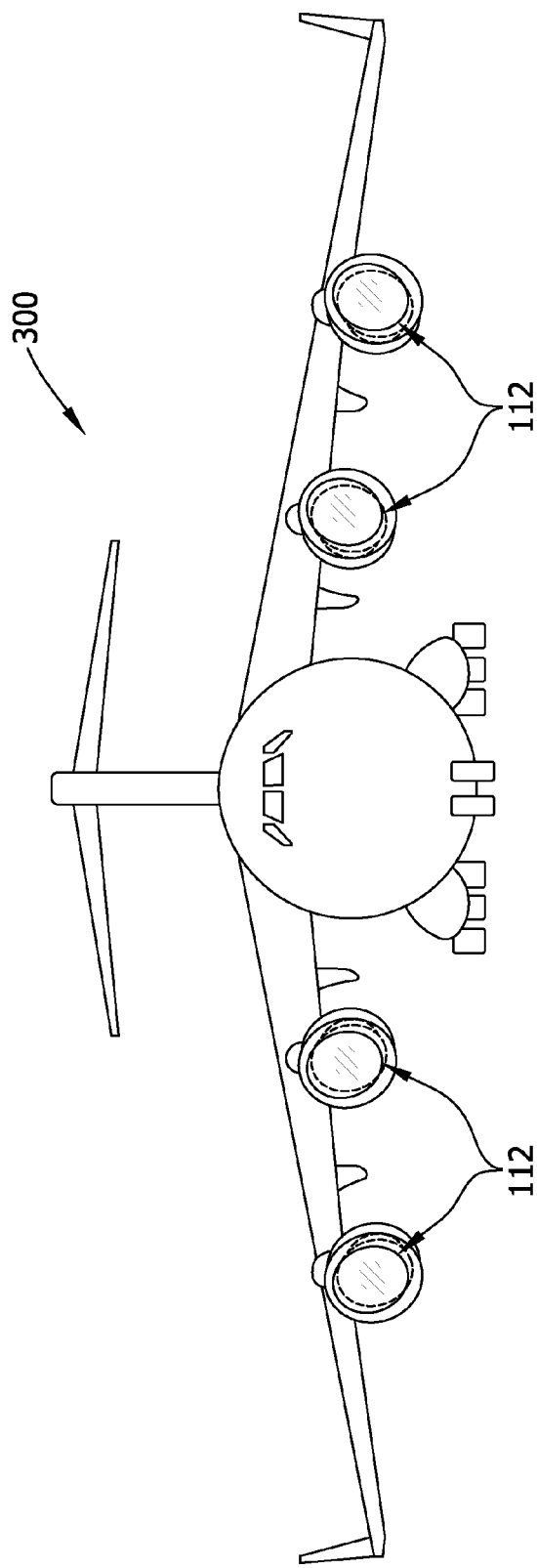
FIG. 6 is a front view of still another aircraft (C-17) according to another embodiment.
Figure 7:
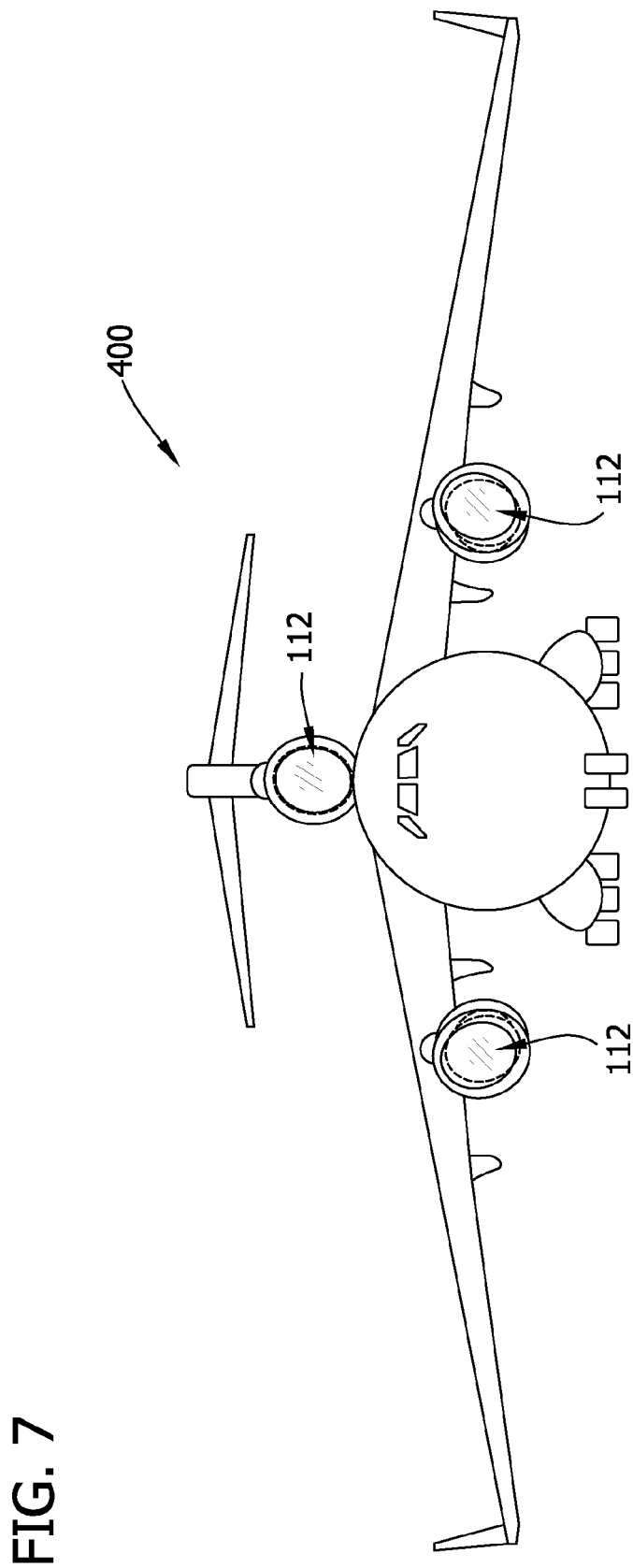
FIG. 7 is a front view of yet another aircraft according to another embodiment.

FIG. 1 illustrates an embodiment of an aircraft 100, and in this embodiment, the aircraft is a tiltrotor aircraft, such as a V-22 Osprey, though other aircraft or helicopters may use the systems of the present disclosure. For example, other aircraft may include those similar to a C-130 (aircraft 200 in FIG. 5), or a C-17 (aircraft 300 in FIG. 6), or a tri-jet (aircraft 400 in FIG. 7). Other engine configurations, including single engine aircraft and aircraft with nose-mounted engines, are contemplated within the present disclosure. Note that embodiments of this disclosure may be advantageous for nose-mounted engines due to the proximity of the intake to the ground.

Aircraft 100 in FIG. 1 generally includes a fuselage 102, wings 103, rotor blades 104, and an aircraft engine 106 mounted in a nacelle 107. The tiltrotor aircraft is configured such that the rotation axis of each rotor blade is independently and sequentially tiltable between a generally vertical position for generally vertical flight and a generally horizontal position for forward flight. The engine may be, for example, a turbine engine, a piston engine, or another type of engine suitable for causing rotation of rotor blades 104 and thereby providing thrust for the aircraft 100. The fuselage 102 defines a forward direction 108, as designated in FIG. 1. Each aircraft engine 106 includes an intake 110 for receiving air through a main opening 111 of the nacelle 107 for receiving air flow for use by the aircraft engine in a combustion process. It should be appreciated that other embodiments may include a different number of intakes for receiving intake air usable in a combustion process. In this embodiment, intake 110 is shown facing generally upward for hovering or vertical takeoff. Once in flight, the engine and rotor are capable of tilting forward so that the main axis of the engine is parallel to the forward direction 108 for forward movement or flight of aircraft 100. In forward flight, intake air flows into the main opening 111 (FIGS. 2-3) and then into the intake 110.

Figure 3:
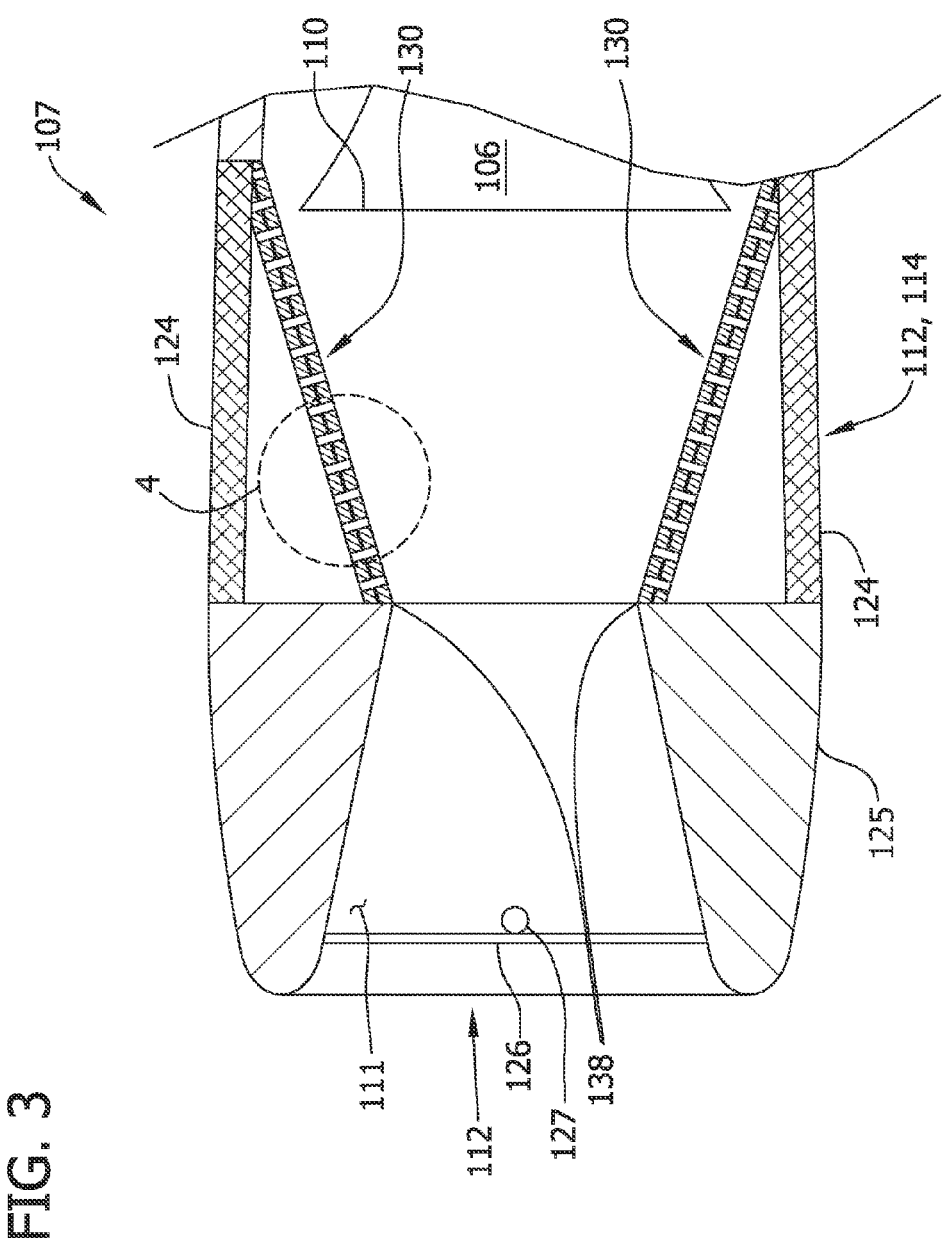
FIG. 3 is a cross-section of an engine intake area of the engine of FIG. 2.

As illustrated in FIG. 3, each nacelle of the aircraft 100 includes filter system 112 (one filter system for each intake) including filter media 124. It should be appreciated that other embodiments may include a different number of filter assemblies. Prior filter systems for aircraft include those shown in co-assigned U.S. Pat. Nos. 6,595,742; 6,824,582; 7,192,462; 7,491,253; and 7,575,014, all of which are incorporated herein by reference.

Figure 2:
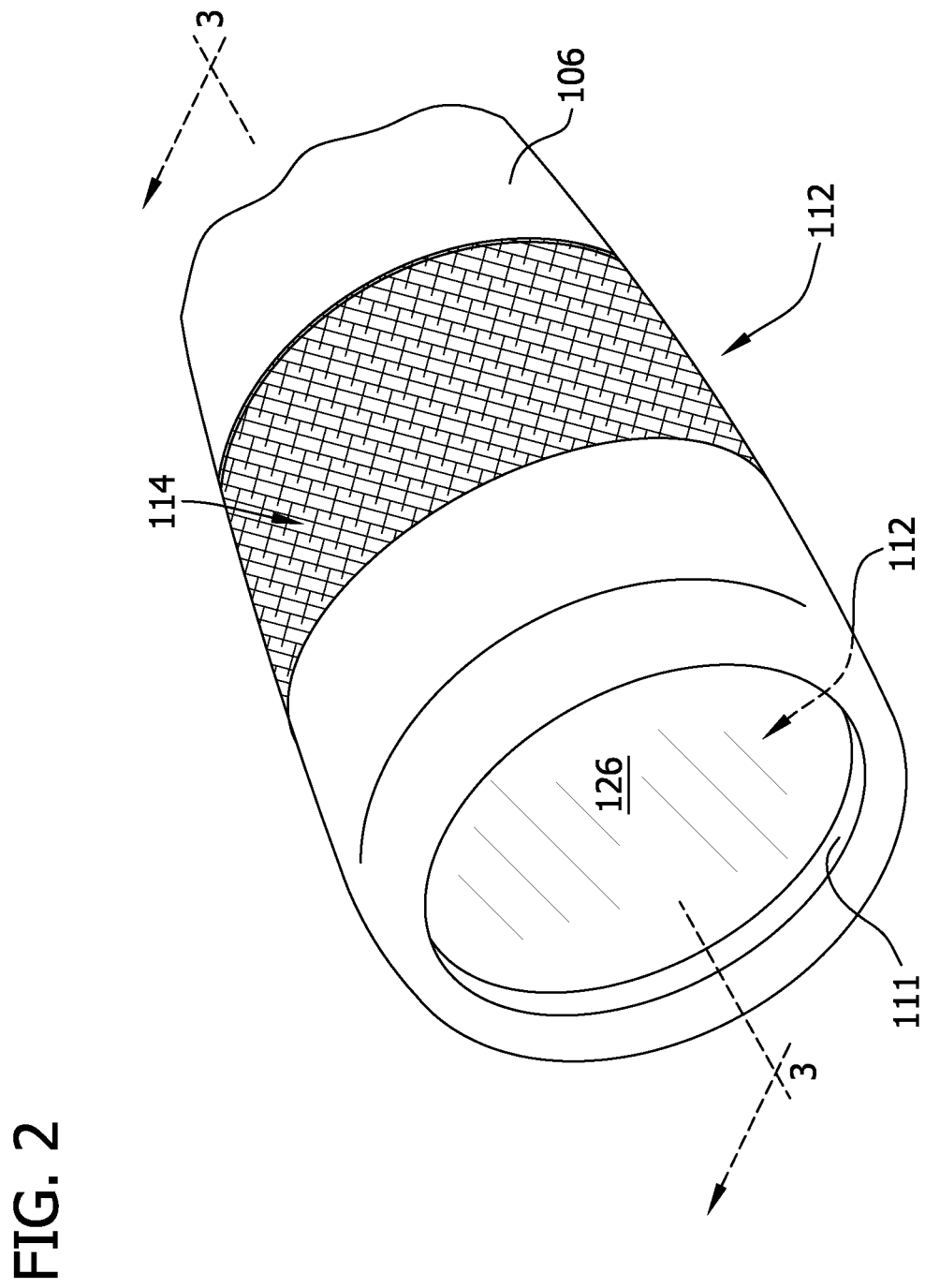
FIG. 2 is a perspective view of an engine of the aircraft of FIG. 1.
Figure 4:
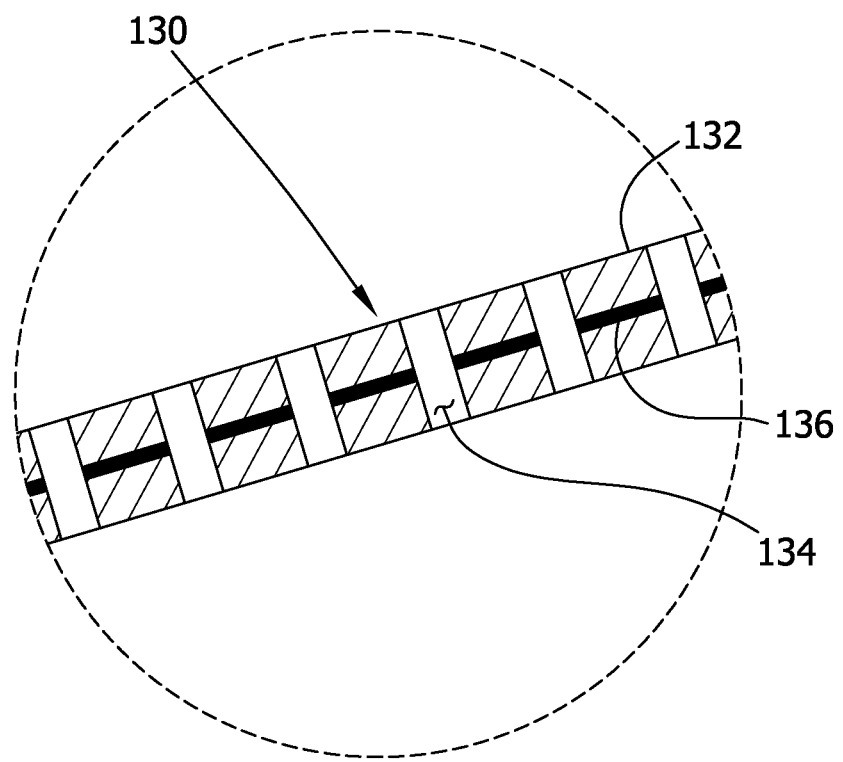
FIG. 4 is an enlarged view of a portion of FIG. 3.

An exemplary filter system 112 is illustrated in FIGS. 2-4. Each of the filter systems 112 is adjacent a respective one of the intakes 110. Intake air passes through the filter system 112 prior to entering the air intake 110 of aircraft engine 106. In other words, the filter system 112 is disposed to impinge air and block objects from entering the intake 110. The filter system 112 is structured to filter intake air to remove containments therefrom, prior to permitting the intake air to enter the air intake 110 of the aircraft engine 106.

Filter system 112 extends around the nacelle 107 forward of the engine inlet. The filter assembly 114 generally defines a substantially annular cross-section. More particularly, in this example embodiment, the filter system 112 defines a cylindrical filter assembly, as shown in FIG. 3. In this embodiment, the filter assembly is substantially conformal to the contour of the nacelle outer surface 125 to reduce or eliminate potential drag on the aircraft caused by the filter system, and thereby minimize or eliminate any "performance penalty" caused by the system.

The filter system 112 includes filter media 124 disposed at least partially about a circumference of the filter assembly 114 for removing contaminants from intake air entering the interior through the filter media 124. A variety of configurations (e.g., size, shape, number of elements, orientation, etc.) of filter media 124 may be included in filter system embodiments. In this embodiment, filter media may include two or more filter elements. The filter elements are configured to remove particles from the intake air, as described in the patents referenced above, including sand, dust, or other particles which may be prevalent in various operating environments for aircraft 100.

A suitable bypass of this embodiment includes a door or valve 126 disposed generally forward of the filter assembly 114 and intake 110. In this embodiment, the valve is a butterfly valve pivotable about a pivot pin 127 mounted laterally or transverse to the flow of air into the nacelle 107 and into the intake 110. An actuator (not shown) is operable to move or pivot the valve from a closed position for directing air through the filter assembly, to an open position for allowing unfiltered air to enter the intake 110 directly, without filtering the air. When closed and the engine is operating, the bypass inhibits unfiltered air from entering the engine, e.g., when the aircraft is hovering, or when the aircraft is near the ground. The bypass may be such that it substantially seals out air and thereby prevents unfiltered air from entering the engine. It is also contemplated that the bypass may have partially opened/closed positions to allow some unfiltered air into the intake 110.

Referring to FIGS. 3 and 4, a de-icing or anti-icing system includes a heated screen 130 for reducing or eliminating ice in the engine intake area (e.g., when the engine is in operation). The screen 130 is mounted in the nacelle 107 of the aircraft 100. The heated screen 130 includes a plate 132 with holes 134 therethrough and a heater 136 (e.g., a heating element, a heat conducting plate or conductive element). In this embodiment, the plate 132 is made of a composite material. More particularly, the plate 132 includes a composite matrix, which may include carbon fiber. The plate 132 may suitably be made using a resin transfer molding (RTM) process with interlaying or interwoven heating elements, or made of an interlayered RTM. Alternatively, the plate 132 may include a heated metal plate or metal screen. The heater 136 may suitably be embedded between adjacent layers of composite material. As shown, the heater 136 is disposed about midway through the composite matrix, and extends substantially the entire length of the plate. The heater 136 is electrically connected to a power source for powering the heater, and may be connected to a controller as described below.

As shown, the screen 130 is positioned in the nacelle 107 between an inner edge 138 of the nacelle and the intake 110. The screen of this embodiment is positioned adjacent the filter assembly 114. In this embodiment, the screen 130 is positioned in the nacelle such that water or ice entering the nacelle must contact the screen before entering the engine when the bypass 126 is closed. The screen 130 is generally annular and in this embodiment is disposed to have an angle, e.g., a diverging angle, from the inner edge 138 of the nacelle to the intake 110.

In this embodiment, holes 134 are formed through the plate 132 to allow air or water to flow from an upper surface of the plate to a lower surface. In this way, water can flow from the plate. Because it is water, rather than ice, it will not damage the engine if it passes through to the engine.

The heated screen 130 of this embodiment includes limited or no fasteners. Among other advantages, the risk of a loose or broken fastener entering the engine intake and damaging the engine is reduced due to the absence of fasteners.

In some embodiments, a sensor (not shown) on or adjacent the screen detects ice on the screen and/or may detect conditions under which ice is likely to form. For example, the sensor is operable to detect at least one of temperature of the screen or formation of ice on the screen. The aircraft 100 includes a controller (not shown) to control one or more functions of aircraft 100. The controller may include or be integrated into, for example, an air vehicle computer or controller. The heating element is connected to the controller so that the controller is operable to energize the heating element to inhibit formation of ice on the replacement filter system 112. In this exemplary embodiment, the heated screen and the sensor thereon are connected to and responsive to the controller 136. More specifically, in one example, when the sensor signals the controller that there is ice on the screen, the controller activates the heater to thereby melt the ice on the screen or to prevent ice from forming. Note that in other embodiments, a sensor disposed on the aircraft remote from the screen may signal the controller that the aircraft is in icing conditions, and this signal may cause the controller to activate the heater in the screen to avoid ice formation or build-up.

The heater 136 may include multiple sections that may be powered or activated separately and independently of one another. For example, certain or discrete sections of the heater 136 may be activated, while other sections remain de-activated to conserve power. A controller may be included that selects which sections to activate depending on the conditions. The icing conditions may be indicated to the controller by the above-described sensor or other sensors.

In use, intake air may enter the interior through the forward opening or through the filter. Water may enter the inside of the nacelle 107, e.g., through the main opening and collect on the screen 130. This water that enters the nacelle 107 tends to collect on the screen. When the aircraft is flying in icing conditions, the water may freeze on surfaces of the nacelle 107, including the screen 130, and form ice. Or, ice may enter the nacelle through the opening and settle on the screen. In either situation, the heater 136 is activated, either by the controller or by the aircraft operator, to cause melting of any ice formed on the screen.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. An aircraft comprising:
   a fuselage;
   wings mounted on opposite sides of the fuselage for sustained forward flight;
   an engine mounted in the fuselage or at least one of the wings and including an air intake, at least a portion of the air intake generally facing forward direction for receiving intake air during forward flight;
   a filter assembly mounted adjacent the air intake and disposed to impinge air and block objects from passing therethrough;
   a heated screen including a heater embedded therein, the screen mounted adjacent the air intake and upstream of the engine such that ice entering the air intake contacts the heated screen before entering the engine; and
   a power source for providing power to the heater.

2. The aircraft of claim 1, wherein the air intake includes a bypass that is movable from a closed position for directing air through the filter to an open position for allowing unfiltered air to enter engine, the bypass inhibiting unfiltered air from entering the engine during hovering or when the aircraft is near the ground.

3. The aircraft of claim 1, further comprising a plurality of engines mounted in nacelles, and associated rotors.

4. The aircraft of claim 3, wherein the aircraft is a tiltrotor aircraft wherein the rotation axis of each rotor is independently and sequentially tiltable between a generally vertical position for generally vertical flight and a generally horizontal position for forward flight.

5. The aircraft of claim 4, wherein the heated screen is made of a composite material.

6. The aircraft of claim 5, wherein the heated screen includes holes therethrough for allowing air and water to pass therethrough.

7. The aircraft of claim 5, wherein the heated screen is disposed between the filter assembly and the air intake such that air passing through the filter assembly also passes through the heated screen.

8. The aircraft of claim 5, wherein the heated screen is mounted at an angle between the nacelle and the air intake.

9. The aircraft of claim 1, wherein the filter assembly extends circumferentially within the air intake and wherein the heated screen is generally annular.

10. The aircraft of claim 3, further comprising a controller operatively connected to the heater and a sensor in the nacelle, the sensor operatively connected to the controller for signaling the controller when the nacelle is icing, and the controller capable of automatically activating the heater in the heated screen in response to the signal.

11. A filter and anti-icing system for an air intake of an aircraft engine, the system comprising:
    a filter assembly disposed to impinge air and block objects from passing therethrough;
    a heated screen including a heat conducting plate embedded therein; the heated screen mounted adjacent the filter such that ice contacts the screen before entering the engine; and
    a power source for providing power to the heater.

12. The system of claim 11, in combination with a tiltrotor aircraft wherein the rotation axis of each rotor is independently and sequentially tiltable between a generally vertical position for generally vertical flight and a generally horizontal position for forward flight.

13. The system of claim 11, wherein the heated screen is made of a composite material.

14. The system of claim 12, wherein the heated screen includes holes therethrough for allowing air and water to pass therethrough.

15. The system of claim 12, wherein the heated screen is disposed between the filter system and the air intake such that air passing through the filter system also passes through the heated screen.

16. The system of claim 12, wherein the heated screen is mounted at an angle between a nacelle and the air intake.

17. The system of claim 16, wherein the filter system extends circumferentially around the nacelle.

18. The system of claim 17, wherein the filter system is conformal to the nacelle outer surface.

19. The system of claim 11, further comprising a controller operatively connected to the heater.

20. The system of claim 19, further comprising a sensor, the sensor operatively connected to the controller for signaling the controller when there is icing, and the controller capable of automatically activating discrete sections of the heater in response to the signal.

* * * * *